W. McK. BLACK.
SOCKET CAP.
APPLICATION FILED DEC. 29, 1910.
985,246.
Patented Feb. 28, 1911.
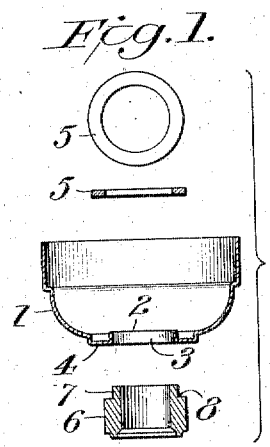
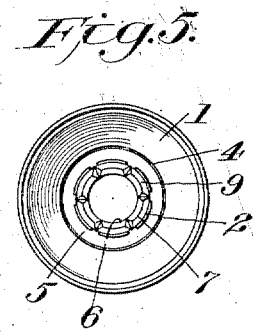
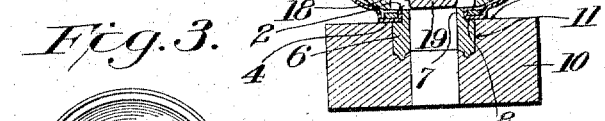
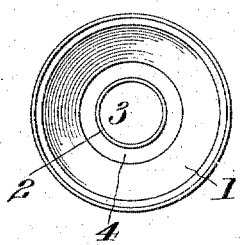
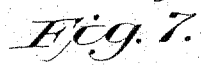
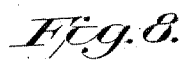
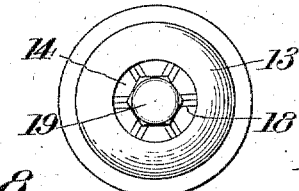
Witnesses
C. N. Walker.
Lillie M. Perry.
Inventor
William McK Black
by
Wm. W. Finckel
Attorney

UNITED STATES PATENT OFFICE.

WILLIAM McK. BLACK, OF WATERBURY, CONNECTICUT, ASSIGNOR TO SCOVILL MANUFACTURING COMPANY, OF WATERBURY, CONNECTICUT, A CORPORATION OF CONNECTICUT.

SOCKET-CAP.

985,246.  Specification of Letters Patent.  Patented Feb. 28, 1911.

Application filed December 29, 1910. Serial No. 599,983.

*To all whom it may concern:*

Be it known that I, WILLIAM McK. BLACK, a citizen of the United States, residing at Waterbury, in the county of New Haven and State of Connecticut, have invented a certain new and useful Improvement in Socket-Caps, of which the following is a full, clear, and exact description.

As very commonly used, the metal cap of electric light sockets, is provided with an applied hub, internally screwthreaded to admit of its being screwed on to the light fixture. This hub is usually cut from solid rod brass and machined to shape and has a flange or other means which is upset or headed up in a hole in the cap. The cap is usually of sheet brass and quite thin. Since there is considerable strain put upon the cap in applying the hub to it, and in screwing the socket to a fixture, it is obvious that the uniting of a hub and cap of such relatively diverse and unequal thickness and strength, presents practical difficulties of considerable complexity. Various means have been used to meet these difficulties.

The present invention is designed to enable manufacturers to produce sockets with a strain-resisting union of hub and cap in a simple and economical manner.

The invention consists of a cap having a continuous unbroken flange surrounding the hub, opening and extending inwardly and surrounded and backed up by a washer laid in a recess, the hub having a flange of about the same depth as the said cap flange, and the hub flange, cap flange and washer being united by means of staking tools, comprising a die, a punch holder coöperating with the die to hold the hub, cap and washer in position, and a punch in the holder so formed as to upset the hub flange, cap flange and washer laterally in any desired manner, and thereby interlock these three parts so intimately and firmly as to resist the utmost strains to which they are exposed in using the socket. Preferably this upsetting, so-called, effected by the staking tools, imparts to the circular flanges a polygonal effect, so that the strain is resisted by axially disposed angular joints which interpose a series of strain-resisting elements of the full length or depth of the flanges.

Another advantage of the invention is that the parts do not have to be located with reference to some previously formed angular portions, as is necessary where the cap flange is made polygonal.

In the accompanying drawings, illustrating the invention, in the several figures of which like parts are similarly designated, Figure 1 shows in cross-section, the three parts of the structure detached, and a plan view of the washer. Fig. 2 is a perspective view of the hub. Fig. 3 is an interior plan view of the cap or shell. Fig. 4 is a longitudinal cross-section of the assembled parts. Fig. 5 is an interior plan view of the structure shown in Fig. 4. Fig. 6 is a longitudinal section showing the staking tools as used. Fig. 7 is a bottom plan view of the staking punch and its holder. Figs. 8 and 9 are respectively a side view and a plan view of a modified form of hub.

The cap or shell 1 may be of any approved metal and configuration, and differs from the ordinary cap in having the solid, continuous or unbroken circular flange 2, extending into the interior of the cap and surrounding the hub hole 3; and also in having the recess 4 encircling the flange 2. The cap flange and this recess are of substantially equal depth. The annular washer 5 is placed in the recess 4, and may be and preferably is of slightly less thickness than the depth of the recess and flange, so that the flange is backed up by the washer.

The hub 6 may be of usual construction, and it is provided with the flange 7 and shoulder 8. This hub flange is of substantially the same depth as the cap flange 2, in order to obtain the greatest possible interlocking area; and in order to enhance its holding effect, the hub flange may be peripherally knurled or otherwise roughened, as indicated in Figs. 8 and 9.

When the cap or shell, the washer and the hub are assembled, as shown in Fig. 6, any suitable staking tools may be used for clenching them together by deforming or upsetting the hub-flange, cap-flange and washer, as indicated at 9 in Figs. 4 and 5. I prefer to unite these parts rigidly and so as to prevent relative turning thereof by lateral displacement of the metal in the line of the longitudinal axis of the socket or cap, for the reason that displacements so arranged present the most effective resistance to such relative turning when exposed to the strains of applying the socket to a fixture. Furthermore, if such lateral displacements are so disposed as to deflect the metal into an approximately polygonal form, there are gained all of the advantages of a preformed polygon without the disadvantages of locating the parts before clenching, as is necessary where the cap flange and the hub flange are furnished in polygonal form.

The staking tools may comprise a die 10, having a matrix 11 to receive the hub, and a face 12 to support the cap. The holder 13 is shaped to fit the interior of the cap, and rest upon the washer. The punch 14 is arranged in this holder, and has a longitudinal movement therein under control of the spring 15 and slot and pin connection 16. The shank 17 serves for inserting the punch in a suitable press. The face of the punch, as shown in Figs. 6 and 7, has a series of radially disposed edged and tapering ribs 18 disposed on curved lines and merging in a centering projection 19 which enters the hub when the punch descends to its work. Upon such descent of the punch, the ribs 18 act upon the hub flange and through it upon the cap flange and washer and spread the flanges laterally at intervals corresponding to the ribs and squeeze or press the flanges into the inner edge of the washer and over such edge, without completely breaking down or folding over the flanges as a whole. In this operation of staking it will occur frequently, if not always, that the inner edges of the flanges will be more or less slightly split, and this will enhance the strain-resting quality of the union.

One of the fundamental elements of the construction is the drawing down of the cap stock to form the integral circular inwardly extending hub-hole or cap flange, whereby the strength of the cap is augmented and the hold of the hub rendered more secure in comparison with prior constructions. In some prior constructions the cap flange has been folded back upon itself or the cap when the hub is clenched in the hub-hole, and while this construction may reinforce the strength of the cap at the place of union, it adds little, if anything to the effectiveness of the joint in resisting twisting or rotary strains in applying the socket to a fixture, whereas the straight and unfolded cap-flange and the axially disposed displacements gain as well the reinforcing of the cap and the rotation-resisting effect.

Where a polygonal hole was used in the shell or cap and a corresponding washer, it was necessary to have the angles of the two coincide, in order to properly stake in the hub so as to effect a satisfactory union, because the metal of the hub was supposed to be squeezed horizontally into the angles of the polygonal hole and washer. If the staking punch were not located or registered truly with these angles, or if the hole and washer were not arranged with their angles alined, the very purpose of these angular parts would be defeated and the joint rendered ineffective, and this difficulty was of frequent occurrence in actual practice. In the present invention, these objections are avoided. The cap flange is drawn down circularly within the shell or cap for a depth substantially equal to the thickness of the surrounding washer and the length of the hub flange, and hence instead of having a thin sheet metal portion of the shell or cap squeezed in between the shoulder of the hub and the washer, as in the old construction, there is a considerable length of metal so staked, and the result is that the hub and cap are held securely against the twisting or rotation incident to securing the socket to a fixture. A washer preferably round or circular, as shown in Fig. 1, may be used, and there is no necessity for locating the parts for staking purposes.

The invention is not limited to any particular design of cap or shell; and, as already sufficiently indicated, the cap is designed for use primarily on the sockets of electric light bulbs. The invention is applicable to any style of cap or socket using a hub connection for attachment to a fixture.

What I claim is:—

1. A cap having a hub-hole and a flange surrounding said hole and projecting within the cap, a circular washer encircling said flange, and a flanged hub inserted in said hole, the thickness of the washer and the length of the hub flange being substantially equal to the depth of the cap flange, and the three being united by laterally disposed displacements of the flanges extending lengthwise of the flanges in the direction of the longitudinal axis of the cap.

2. A cap having a hub-hole and a circular flange extending within the cap around said hole, a recess in the cap surrounding said flange, a circular washer in said recess and of a thickness substantially equal to the depth of the flange, a hub having a flange of substantially the length of the cap flange and inserted in it, and stakings arranged within the hub flange and embedding said flange in the cap flange and washer throughout the length of the two flanges and in the direction of the longitudinal axis of the cap.

In testimony whereof I have hereunto set my hand this 28th day of December A. D 1910.

WILLIAM McK. BLACK.

Witnesses:
PERCY WARNER.
E. A. HYDE.

It is hereby certified that in Letters Patent No. 985,246, granted February 28, 1911, upon the application of William McK. Black, of Waterbury, Connecticut, for an improvement in "Socket-Caps," an error appears in the printed specification requiring correction as follows: Page 1, line 32, after word "hub" the comma should be stricken out; and that the said Letters Patent should be read with this correction therein that the same may conform to the record of the case in the Patent Office.

Signed and sealed this 21st day of March, A. D., 1911.

[SEAL.]

E. B. MOORE,
*Commissioner of Patents.*